United States Patent
Ho et al.

(10) Patent No.: US 7,949,808 B2
(45) Date of Patent: May 24, 2011

(54) AUTO-EXECUTION SIGNAL PROCESSING METHOD AND APPARATUS PERFORMING THE METHOD

(75) Inventors: Yi-Chen Ho, Taipei (TW); Chi-Chen Cheng, Taipei (TW); Min-Chi Ko, Bali Township, Taipei County (TW)

(73) Assignee: C-Media Electronics Inc., Taipei (TW)

( * ) Notice: Subject to any disclaimer, the term of this patent is extended or adjusted under 35 U.S.C. 154(b) by 194 days.

(21) Appl. No.: 12/493,695

(22) Filed: Jun. 29, 2009

(65) Prior Publication Data

US 2010/0169510 A1     Jul. 1, 2010

(30) Foreign Application Priority Data

Dec. 31, 2008    (TW) .............................. 97151555 A

(51) Int. Cl.
    *G06F 13/10*    (2006.01)
(52) U.S. Cl. ............................. 710/72; 710/63
(58) Field of Classification Search .................. None
    See application file for complete search history.

(56) References Cited

U.S. PATENT DOCUMENTS

| | | | |
|---|---|---|---|
| 6,668,376 B1 * | 12/2003 | Wang et al. | 717/178 |
| 6,694,354 B1 * | 2/2004 | Elg | 709/217 |
| 7,028,308 B2 * | 4/2006 | Kim | 719/321 |
| 7,047,331 B2 * | 5/2006 | Dickens | 710/63 |
| 7,076,536 B2 * | 7/2006 | Chiloyan et al. | 709/220 |
| 7,165,109 B2 * | 1/2007 | Chiloyan et al. | 709/227 |
| 2003/0177169 A1 * | 9/2003 | Nutt et al. | 709/201 |
| 2004/0104893 A1 * | 6/2004 | Huang | 345/168 |
| 2005/0160157 A1 * | 7/2005 | Collier et al. | 709/222 |
| 2006/0152493 A1 * | 7/2006 | Yang et al. | 345/168 |
| 2007/0232233 A1 * | 10/2007 | Liu et al. | 455/41.2 |
| 2008/0062130 A1 * | 3/2008 | Lin | 345/163 |
| 2008/0235339 A1 * | 9/2008 | Lurey et al. | 709/206 |

* cited by examiner

*Primary Examiner* — Cheng-Yuan Tseng
(74) *Attorney, Agent, or Firm* — Muncy, Geissler, Olds & Lowe, PLLC

(57) ABSTRACT

An auto-execution signal processing method and an apparatus performing the method are provided. That method is particularly applied to the apparatus supporting recognition of a human interface device standard. The apparatus preferably has an activation element such as a button, and it is to execute an automatic execution process by a key-activation manually or automatically as in connection with a computer system. Therefore, a predetermined purpose is met. According to a preferred embodiment, the apparatus having the auto-execution function is firstly initialized. Next, the activation element thereon is used to launch the automatic execution process. The process includes a step of driving a Finite State Machine to transfer an executable string of code to a computer system via a connection interface. After that, the executable string is compiled by an operating system in order to launch an application, such as entering a proprietary webpage.

15 Claims, 11 Drawing Sheets

AUTO-EXECUTION SIGNAL PROCESSING METHOD AND APPARATUS PERFORMING THE METHOD

BACKGROUND OF THE INVENTION

1. Field of the Invention

The present invention relates to an auto-execution signal processing method and an apparatus therefor, more particularly to the apparatus employs a human interface device standard, and an auto-execution process is initiated by an activation element mounted thereon.

2. Description of Related Art

The hotkey technology is in widespread use, and becomes a common tool. In the prior arts, a plurality of hotkeys may be designed on a mouse or a keyboard in order to provide a streamlined scheme to execute a specific program. Reference is made to FIG. 1 showing a multimedia keyboard 10. This multimedia keyboard 10 uses a Microsoft Windows operating system standard to design the several hotkeys which are mounted on the spare space of the keyboard. Therefore, a user may easily use the hotkeys to perform some functions.

The shown first hotkey 101 is exemplarily used to generate a signal to execute email software. The signal is transferred to the operating system, and the corresponding email software is executed. The second hotkey 102 corresponds to the function executing a browser, like the IE. In this example, a corresponding signal is generated to execute the browser after pressing the hotkey 102. More, the third hotkey 103 corresponds to the function for adjusting the volume. In which, a window is provided for functioning as adjusting volume as manipulating the third hotkey 103.

Although the conventional hotkeys having their corresponding functions are provided, a proprietary driver is requisite to be installed in the computer system if a special hotkey is configured for streamlining a complicated procedure in the computer system. In which, if a hotkey is directed to an online help, downloading software, or using a browser to go to a specific webpage, the proprietary driver is needed. For example, any hardware relating the hotkey employs a program carried in a CD to achieve a specific objective through a configuration. Thus, the specific function can not be used if the driver is lost.

The hotkey technology is not limited to the above keyboard, but also applied to some products for more convenient applications. For instance, the hotkeys are used for the peripherals connected to the computer system, or the household appliances with a micro-computer. However, those hotkeys applied to the peripherals or appliances are unchangeable. Some of them need a proprietary driver to transform their functions. Some of them need the extra efforts made by manual manipulation to achieve a particular purpose.

SUMMARY OF THE INVENTION

In the light of a proprietary driver or a special manual manipulation needed for the conventional hotkey technology to achieve a specific purpose, and probably any problem as losing the driver, the present invention provides an auto-execution signal processing method and an apparatus performing the method. Preferably an IC hardware technology is introduced in the present invention. The IC hardware technology can be automatically used to achieve the specific purpose without any proprietary software. Particularly, an activation element, such as a button, is incorporated with an update process, in order to define the preferred function for the hotkey.

According to the preferred embodiment, the method firstly initiates an apparatus having an auto-execution function. The apparatus employs a universal serial bus to connect with a computer system and gains power supplied therefrom. After that, the apparatus is driven by the operating system. Next, an activation element, such as a button, mounted on the apparatus is used to activate an auto-execution process. As activation, a signal processing circuit of the apparatus is driven. Preferably a finite state machine is provided to be driven to transfer an executable string to the computer system via USB. Next, the operating system of the computer system compiles the string to generate an operation thread, in order to execute a specific program for special purpose.

In a preferred embodiment, the mentioned activation element generates a signal with corresponding hotkey, such as a key code. After generating the activation signal, the finite state machine transfers the executable string to the computer system for activating a specific process. For example, the string is induced to launch a web browser, and enter a web page.

The apparatus having the auto-execution function of the present invention physically has a signal processing circuit used for processing the signal of the apparatus. The finite state machine is composed of a series of logic circuits. The activation element is particularly connected to this signal processing circuit, and used to generate an activation signal, in order to activate an auto-execution process. The apparatus further has a human interface device which generates a signals used for identifying the apparatus. A central control interface is further introduced to control the circuits used for transferring the signals.

In further preferred embodiment, the claimed apparatus includes a read-only memory block recording the executable string. A rewritable memory block capable of updating its content can also be used. Consequently the activation element is used to activate the auto-execution process for a specific purpose according to the string.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

It is different from the prior art, in order to achieve a specific purpose, the auto-execution signal processing method and the apparatus therefor of the present invention are provided. The invention is used to execute an auto-execution process without any need of an extra driver. An auto-execution means without any need of driver is particularly introduced into the apparatus. Especially to the peripheral hardware connected to a computer system, an activation element functions as a hotkey, such as a button or a switch mounted on the apparatus. The activation element is used to provide a specific function related to an individual peripheral. For example, the mentioned browser is automatically launched by the auto-execution means.

In process of activation, a segment of URL string is brought out from an executable string of code. The string drives the browser to enter a specific web page. Preferably, a proprietary web page having an online help for the peripheral is entered. Moreover, the string can be directed to a web page with hardware maintenance, driver updating, related activities, latest news, sponsor or the like. Those special web pages are often entered by a series of manual steps beforehand.

An aspect of IC hardware is preferably adopted by the present invention. A finite state machine (FSM) composed of a series of logic circuits is particularly introduced. Without need of special software, the finite state machine can generate a signal presenting some special message through the circuit. Further, the finite state machine can automatically reach some purposes which originally need many steps to achieve. Since the proprietary driver may be lost and meet an awkward situation, the finite state machine provides a solution as it can automatically enter a web page to download the latest driver.

The apparatus having an auto-execution function further includes a rewritable memory block for storing new executable string. Therefore, the activation element may provide new function rather than the original one.

Figure 1:
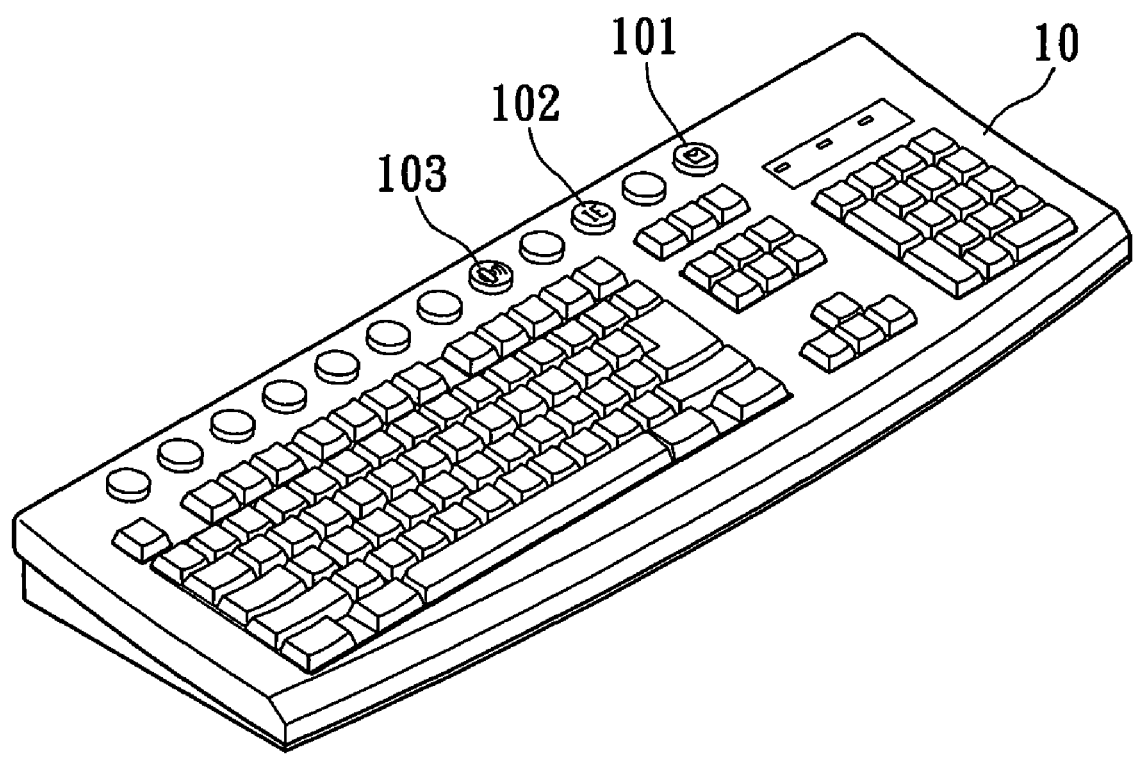
FIG. 1 shows a schematic diagram of a conventional multimedia keyboard having a hotkey.
Figure 2:
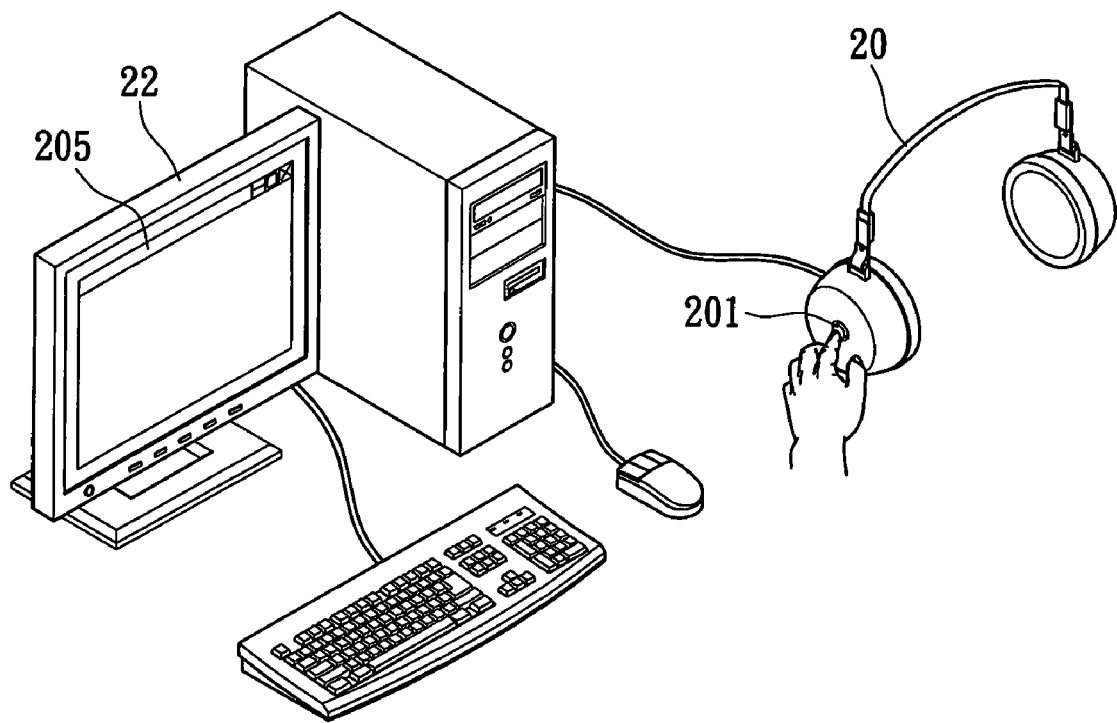
FIG. 2 shows an exemplary diagram of an apparatus having an auto-execution function of the present invention.

Reference is made to FIG. 2 showing a schematic diagram of the apparatus having the auto-execution function. A set of earphone coupled to a computer 22 is shown in the figure. In which a wired or wireless means is used to implement the connection therebetween, and the interface can be USB, IEEE1394, Bluetooth, or PS/2. More particularly, a hotkey 201 is mounted on the earphone 20. After pressing the hotkey 201, a browser 205 or a specific program is automatically executed as driving the operating system of the computer 22 by the claimed method. In the meantime, the browser 205 is used to enter a specific web page.

The auto-execution means of the present invention can be initiated through the activation element, such as one or more hotkeys, mounted on the apparatus. The apparatus connects to the computer system via a connection interface, preferably the USB. One of the advantages is to supply power to the apparatus from the computer system as connecting thereto. When the hotkey is pressed or other mechanism having the auto-execution function is executed by a user, the signal processing circuit in the apparatus is driven to transfer a string to the computer system. After that, a predetermined function works. More particularly, the signal processing circuit can be implemented as a micro-processing chip, or a finite state machine composed of a series of logic circuits.

Figure 3:
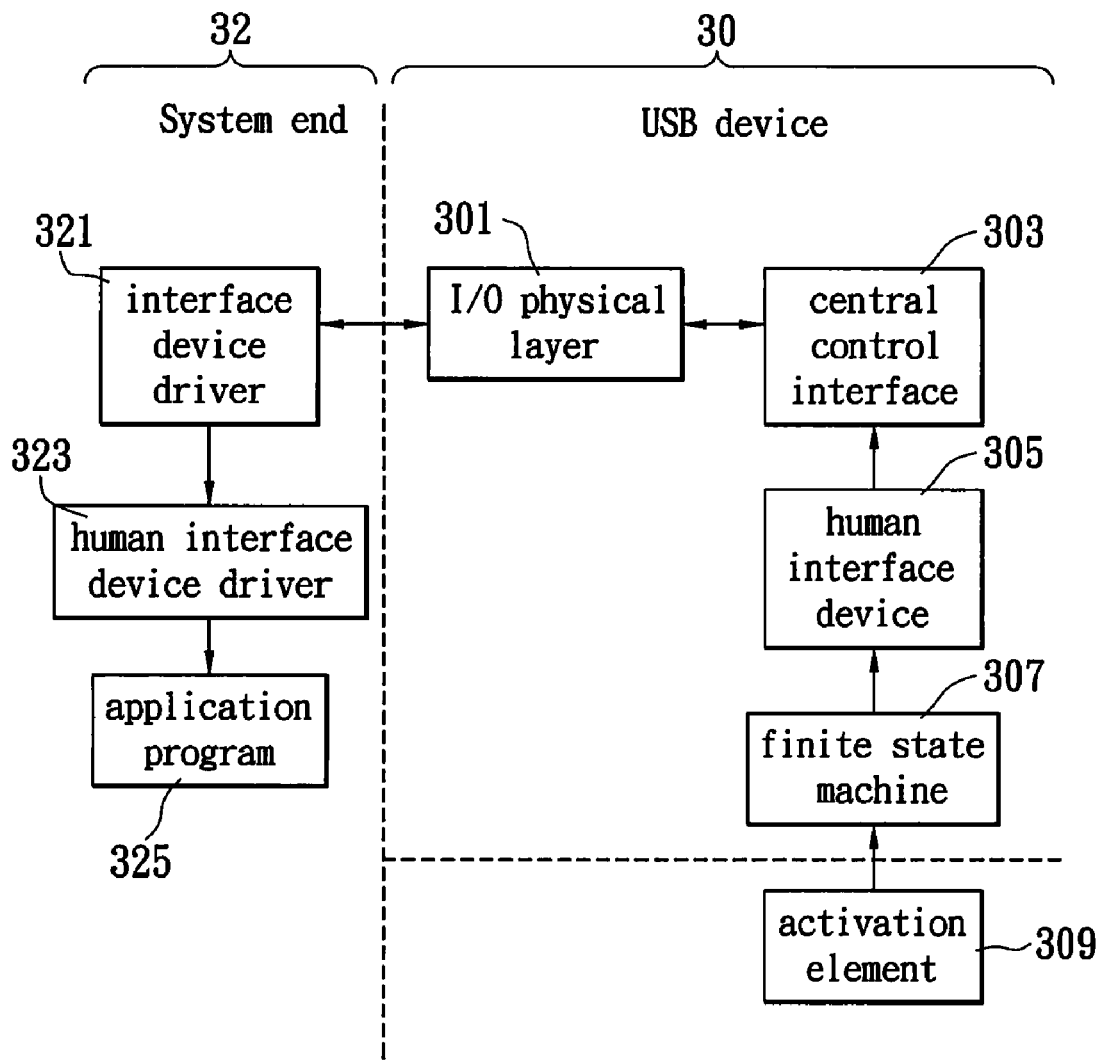
FIG. 3 shows a block diagram of the apparatus of the embodiment of the present invention.

Reference is made to FIG. 3 showing a functional block of the apparatus having the auto-execution function. In this example, the apparatus with USB preferably employs USB as a transmission interface. However, the practical embodiment is not limited to the USB.

In the figure, a connection between a USB device 30 (such as the earphone of FIG. 2) and a system end 32 (such as the computer of FIG. 2). The USB device 30 disposes an activation element 309 with an auto-execution function. The rest elements include the electrically connected I/O physical layer 301, central control interface 303, human interface device 305 and finite state machine 307. The preferred embodiment of the system 32 has an interface device driver 321, a human interface device driver 323, and a computer of an application program 325.

The USB device 30 mainly includes a signal processing circuit which is used for executing an executable string. The finite state machine 307 composed of a series of logic circuits is preferably used. After initializing the claimed apparatus, the finite state machine 307 is driven to transfer the executable string. The activation element 309 is particularly used for generating an activation signal, thereby to activate an auto-execution process. The activation element 309 is preferably one or more buttons. Through one or more clicks, one or more corresponding key codes are generated for activating the auto-execution process.

The human interface device (HID) 305 electrically connected to the finite state machine 307 is further provided. The signal generated by the USB device 30 is transmitted to the computer through the human interface device 305. The operating system in the computer identifies the USB device 32 via a HID signal generated by the human interface device 305. Therefore, the system end 32 can identify the type of the USB device 30 and the format for signal processing.

The central control interface 303 is in charge of signaling management, and used to control the circuits transferring every type of signals. One of the signals is the signal from the I/O physical layer 301. In the preferred embodiment, the I/O physical layer 301 is implemented as USB or Bluetooth transmission interface. The apparatus thereby connects to the system end 32 via the connection interface, and transfers signals therethrough.

The present invention employs the activation element 309 which communicates to the system end 32 by an interrupt mechanism. Through the interrupt mechanism, the activation signal generated by the activation element 309 and the executable string of code are transferred to the system end 32 via an interface device driver 321.

The finite state machine 307 disposed in the USB device 30 records a specific content, such as the executable string, through a series of logic circuits. When the USB device 30 connects to the system end 32, the I/O physical layer 301 is coupled to the device driver 321 of the system end 32. After that, the system end 32 supplies power to and executes a firmware program to drive the USB device 30. The initialization is done.

Subsequently the activation element 309 generates the activation signal, for example, the user presses a button to trigger a signal. Next, the finite state machine 307 issues the executable string of code to the human interface device 305. The executable string of code is transmitted to the system end 32 through the central control interface 303 and the I/O physical layer 301. Through the interface device driver 321 in a low level routine of the operating system, the system end 32 receives the HID signal. Then a human interface device driver 323 is used to compile the signal. After the compiling, an execution thread is created by the operating system to execute the specific application program 325. The application program 325 is the specific software or a specific function that is automatically executed according to the executable string. One of the objects of the present invention is automatically to launch a browser, and enter a web page, download a driver, or perform other functions.

Figure 4:
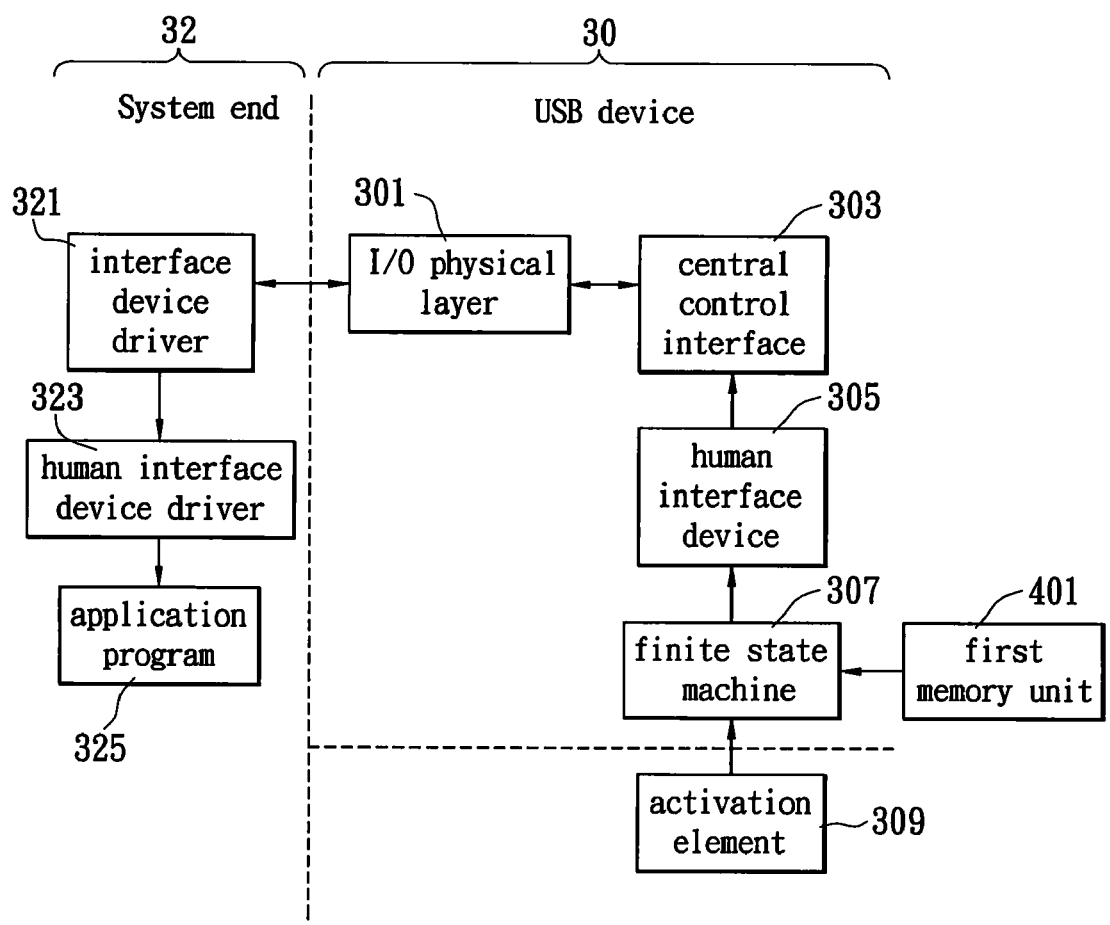
FIG. 4 shows a block diagram of the apparatus of the second embodiment of the present invention.

According to the functional block of the preferred embodiment shown in FIG. 4, a first memory unit 401 is new added in the claimed apparatus. The first memory unit 401 is used to record a preset executable string of code, and the first memory unit 401 can be a read-only memory block (ROM). It is featured that the preset executable string of code has been burned into this read-only memory as it leaves the factory. The preset executable string is used for achieving an original purpose. In the exemplary example, the finite state machine 307 reads out the string from an executable block of the first memory unit 401 after it is initiated. The string is transferred to the system end 32 thereby for executing the specific application program 325.

Figure 5:
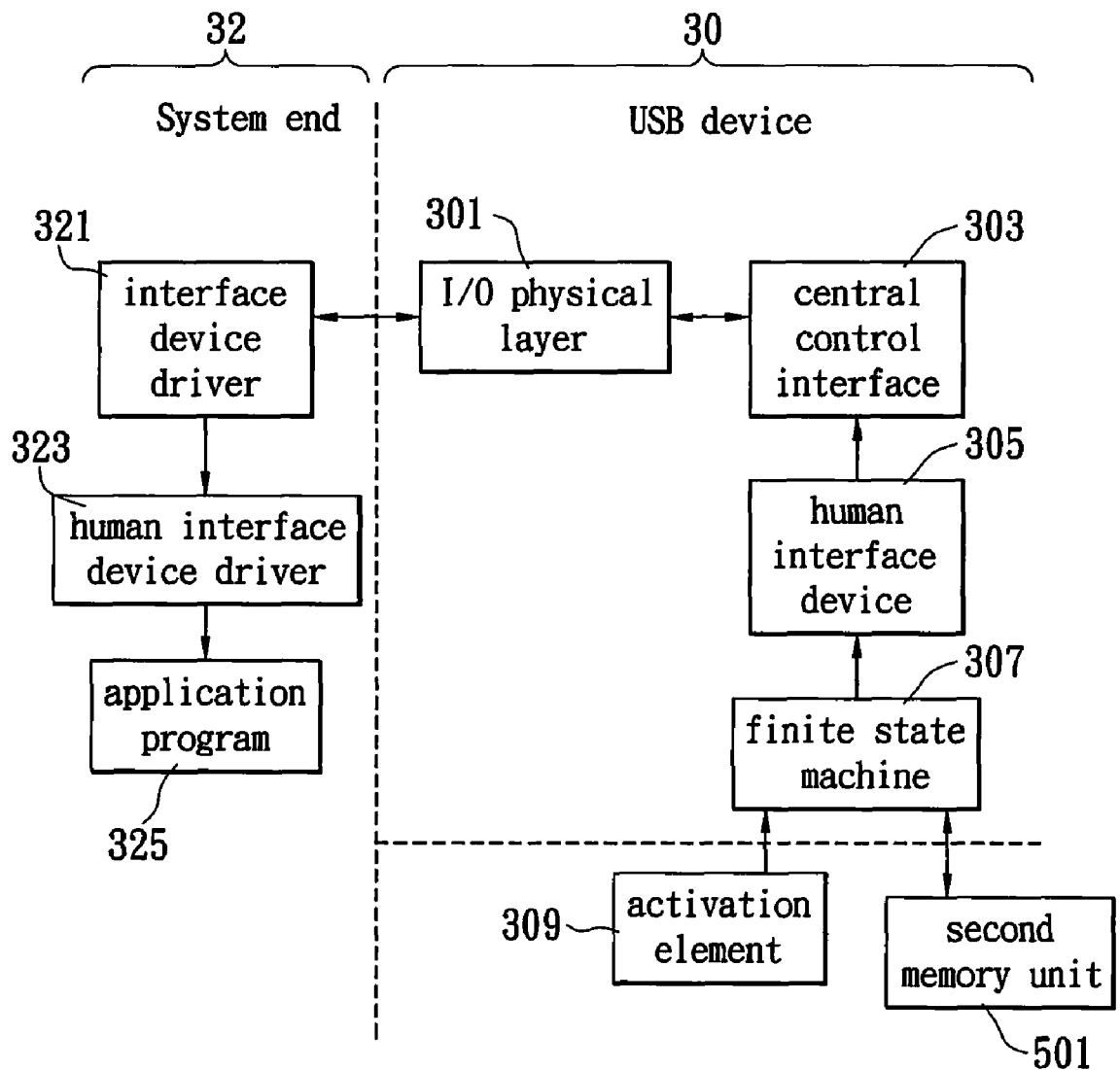
FIG. 5 shows a block diagram of the apparatus of the third embodiment of the present invention.

Reference is made to FIG. 5. A second memory unit 501 is new added in the claimed apparatus having the auto-execution function. The second memory unit 501 is not identical with the first memory unit 401 disclosed in FIG. 4. The second memory unit 501 can be particularly disposed on the exterior of the apparatus, just as the implementation of the mentioned activation element 309. The second memory unit 501 is further electrically connected with the interior finite state machine 307. According to the preferred embodiment, the second memory unit 501 is a rewritable memory block, it is noted that the recorded string can be changeable. For example, the string can be modified through the driver of the claimed apparatus, or preferably merely under some certain situations. Consequently, the content of the second memory unit 501 can be read out when the finite state machine 307 is initiated.

Figure 6:
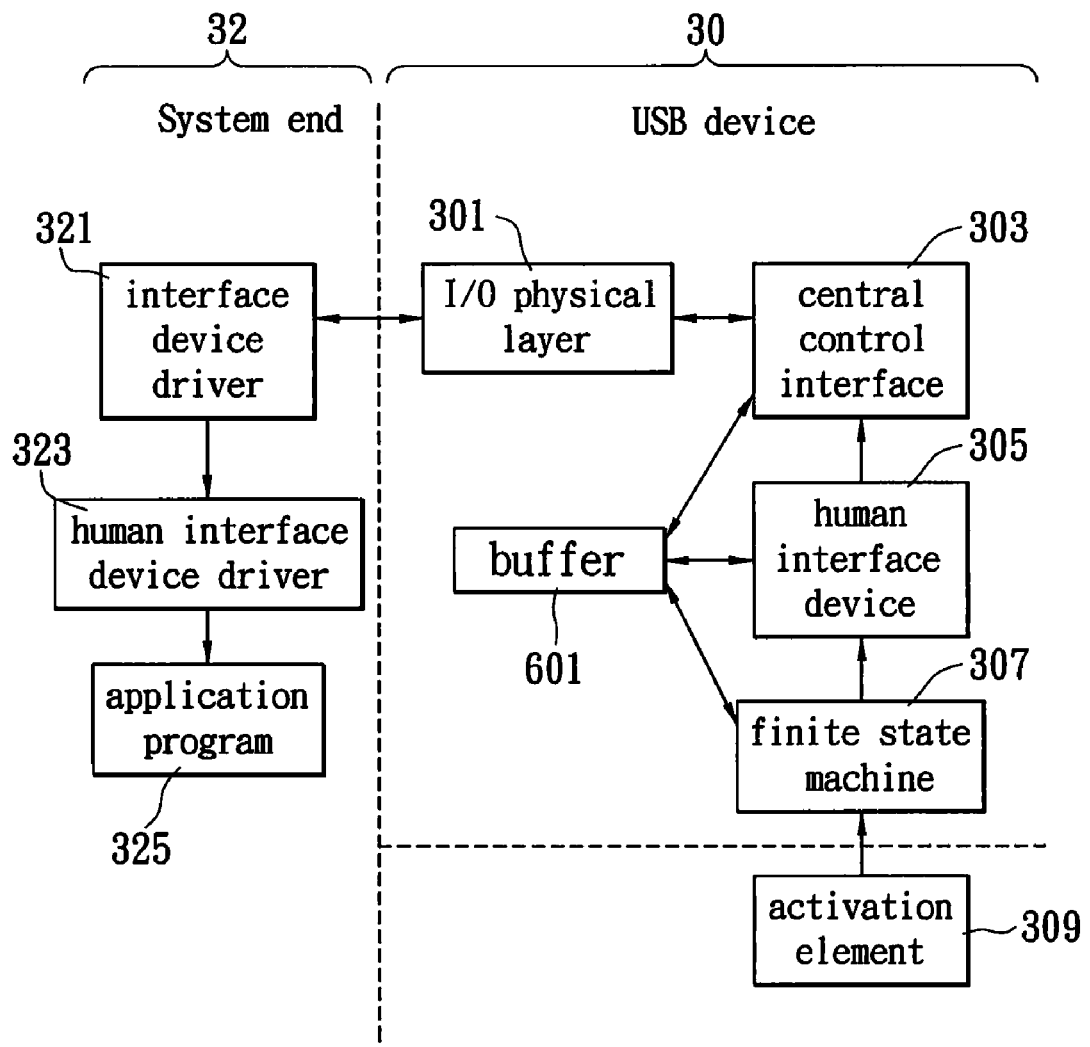
FIG. 6 shows a block diagram of the apparatus of the fourth embodiment of the present invention.

FIG. 6 shows another embodiment of the present invention. A buffer 601 for buffering the certain value is particularly disposed in the claimed apparatus. The apparatus having the auto-execution function provides a scheme that can change the updating process with an original purpose. In the exemplary example, the mentioned auto-execution process is executed after initializing the USB apparatus 30 at first time. The "first-time initialization" occurs as the USB apparatus 30 connects to the computer that never being connected. If the USB apparatus 30 connects to the same computer again, the first-time initialization works. The current example shows that the auto-execution process is originally to download a driver or an application program from a specific destination. After that, the driver or the application program is installed in the computer.

If the apparatus having the auto-execution function, such as the USB apparatus 30, connects to the same computer system at a second time or more times, the existed driver or application program can be identified. In the meantime, the driver or application program drives a certain value to be written into the buffer 601 through the I/O physical layer 301 and the central control interface 303. As shown in the figure, the central control interface 303, the human interface device 305, and the finite state machine 307 uses the content in the buffer 601 to decide an operation route.

Next, a user may use the activation element 309 to generate the activation signal, and the finite state machine 307 receives the signal. The finite state machine 307 can perceive the certain value existed in the buffer 601 afterward. The USB apparatus 30 can achieve different purposes after determining the operating mode of the apparatus 30. Via the route, the finite state machine 307 can issue another executable string to the human interface device 305, and reach the system end 32 through the central control interface 303 and the I/O physical layer 301. Then the low-level interface device driver 321 recognizes the string and determines that is from the human interface device 305. The HID 305 generates HID signal and transfers it the human interface device driver 323. After that, it reaches an updated purpose after the application program 325 receives the signal.

Figure 7:
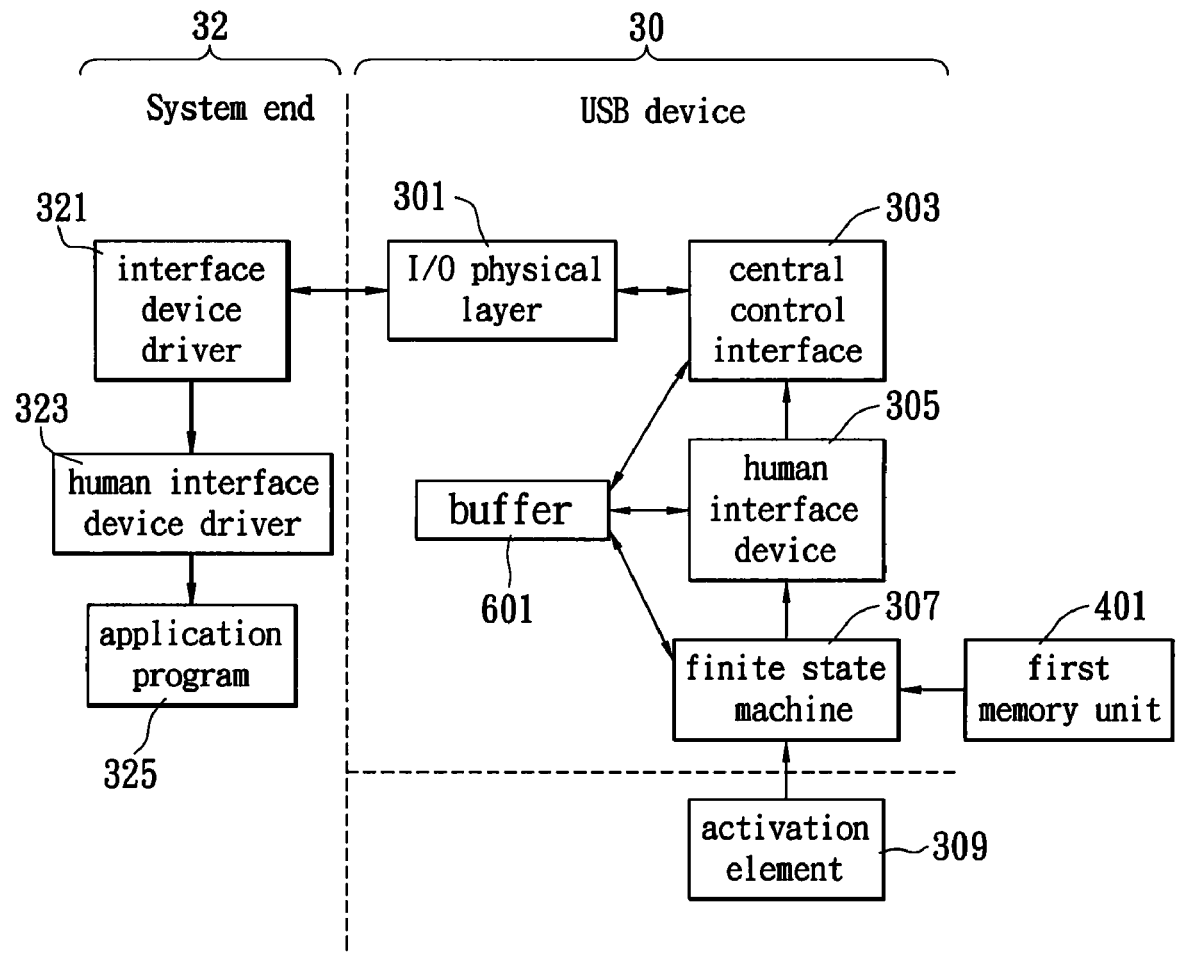
FIG. 7 shows a block diagram of the apparatus of the fifth embodiment of the present invention.

FIG. 7 shows a scheme illustrating that the operating mode of the USB device 30 is determined according to the value recorded in the buffer 601. The described finite state machine 307 reads the executable string from the first memory unit 401 disposed in the claimed apparatus.

Figure 8:
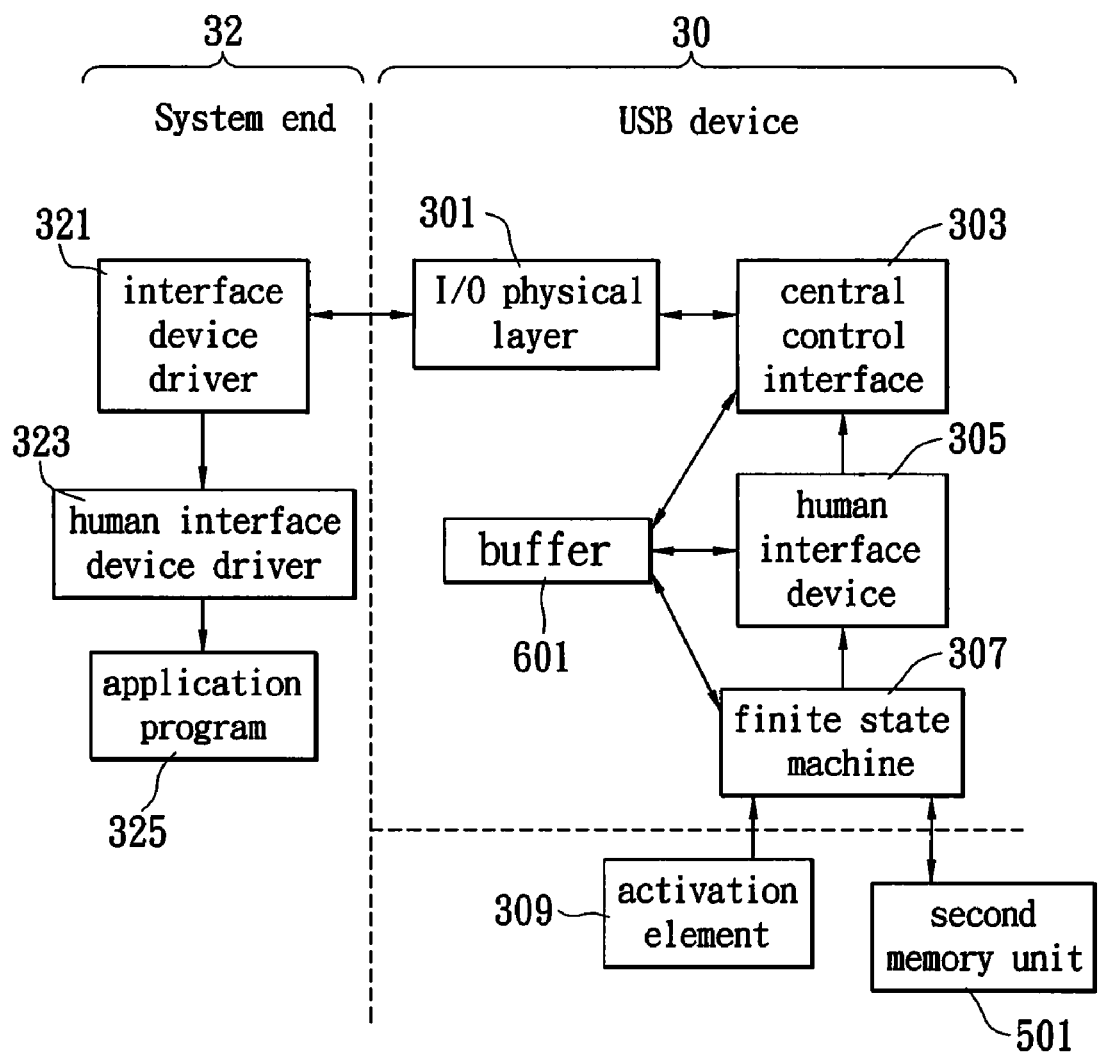
FIG. 8 shows a block diagram of the apparatus of the sixth embodiment of the present invention.

FIG. 8 shows a preferred embodiment with corresponding the scheme of FIG. 7. The central control interface 303, human interface device 305 and the finite state machine 307 commonly use the content of buffer 601 to decide an operating mode. The finite state machine 307 reads the executable string from the second memory unit 501 which is disposed on the exterior of the apparatus. The certain value recorded in the buffer 601 is used to determine the string to be transferred.

Figure 9:
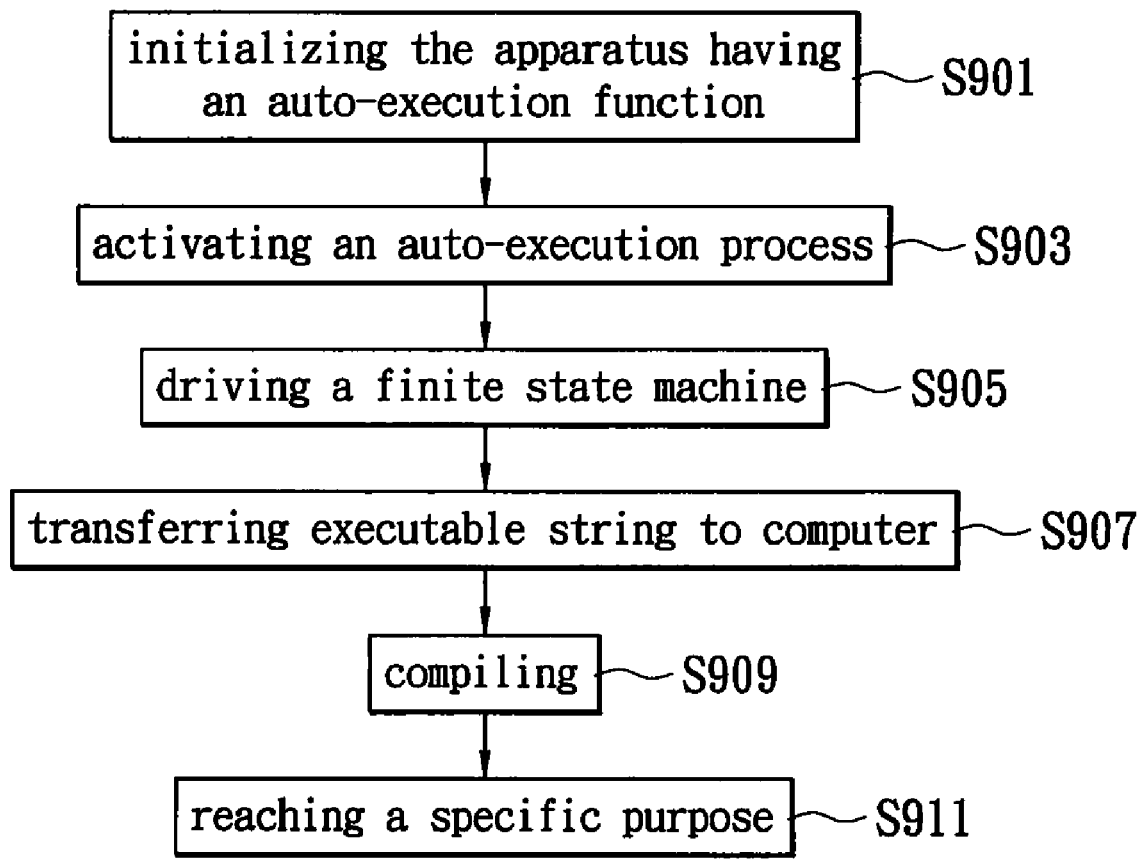
FIG. 9 shows a flowchart of the auto-execution signal processing method of the present invention.

FIG. 9 shows the flow chart of the preferred embodiment of the present invention. In the first step S901, the claimed apparatus having the auto-execution function is initialized. The apparatus can be a device using USB interfacing. Therethrough the apparatus gains power supplied from a computer system. The operating system identifies the apparatus by accomplishing the initialization through a standard HID driver.

Next, an activation element disposed on the apparatus is used to activate an auto-execution process (step S903). For example, a button is preferably pressed to activate the auto-execution process. In step S905, the auto-execution process includes a step of driving a finite state machine of the apparatus. The finite state machine then transfers its recorded executable string to a computer through an I/O physical layer and an interface device driver at a system end (step S907). The executable string can alternatively read from the internal or external memory unit. Next, an operating system of the computer system compiles or decodes the string (step S909). In the meantime, the operating system generates an operating thread used for executing an application program, which is the specific purpose to be reached (step S911). The purpose can be executing a browser and entering a specific web page.

The original string can be recorded in a read-only memory block or a rewritable memory block. The finite state machine reads out the string and transfers it to the computer system as the apparatus connects to the computer. Further, the string recorded in the rewritable memory block is modifiable for some special purposes.

Figure 10:
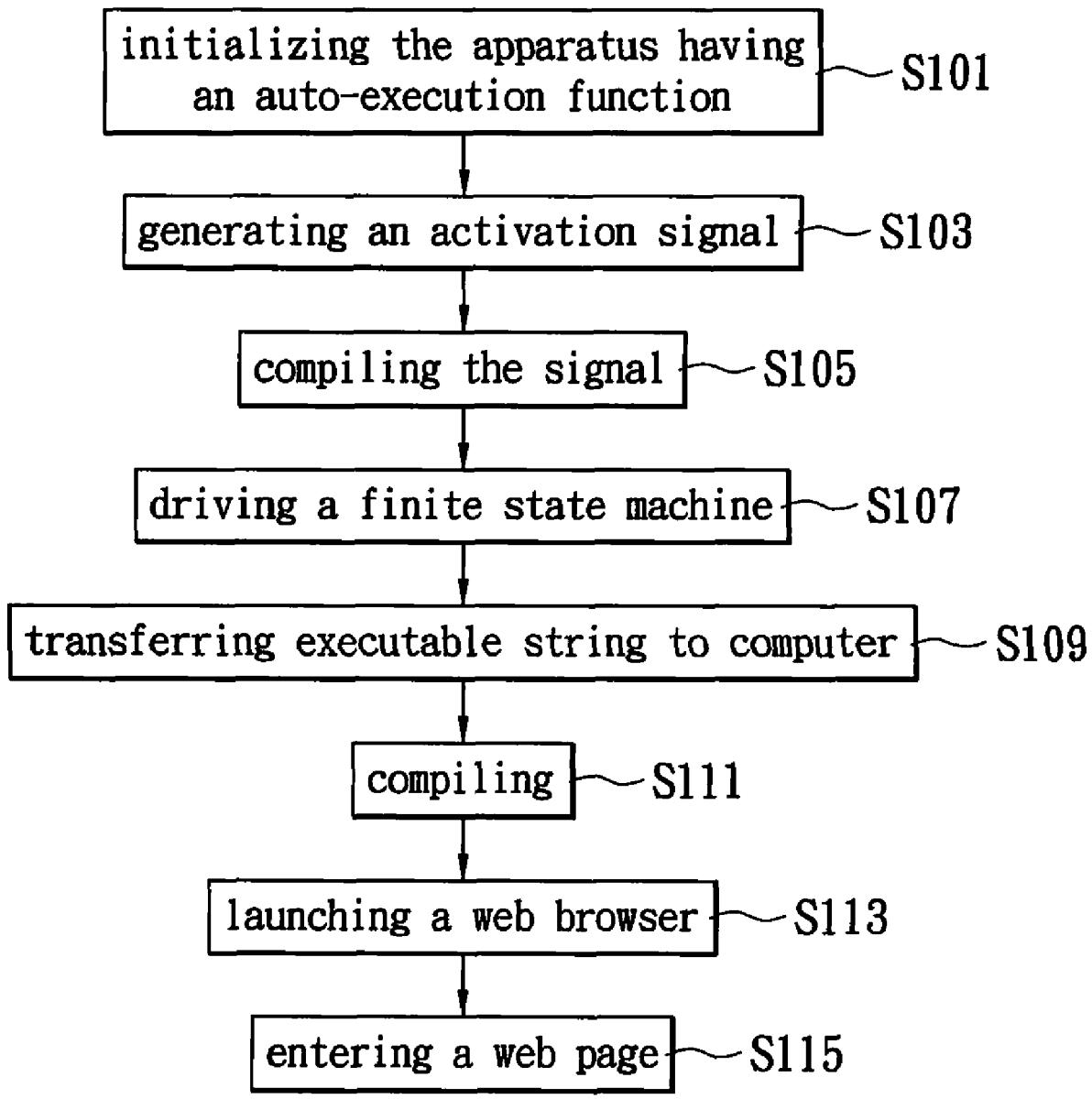
FIG. 10 shows a flowchart of the auto-execution signal processing method of the present invention.

One embodiment, such as the flow chart of the method, is shown in FIG. 10. In the beginning of the steps, the apparatus having the auto-execution function is initialized (step S101). The initialization includes connecting to the computer system, supplying power, and driving the apparatus. Next, the activation element is used to generate an activation signal (step S103). The activation signal is then compiled (step S105). Next, the finite state machine is driven (step S107). The finite state machine can transfer its recorded executable string, or the string read from the internal or external memory block to the computer system (step S109). After that, the operating system compiles the string in step S111. After determining the operating mode, in the preferred embodiment, the method goes to launch a browser (step S113) and enter a web page (step S115).

In another embodiment, the web page provides a latest driver to be downloaded or installed. If the apparatus is first time connected to the computer system, it means no any driver is installed. The above-described steps are processed to achieve a preset purpose. The apparatus is initiated since the driver is installed in the operating system. Through a determination mechanism, a new purpose with corresponding generated signal is achieved.

Figure 11:
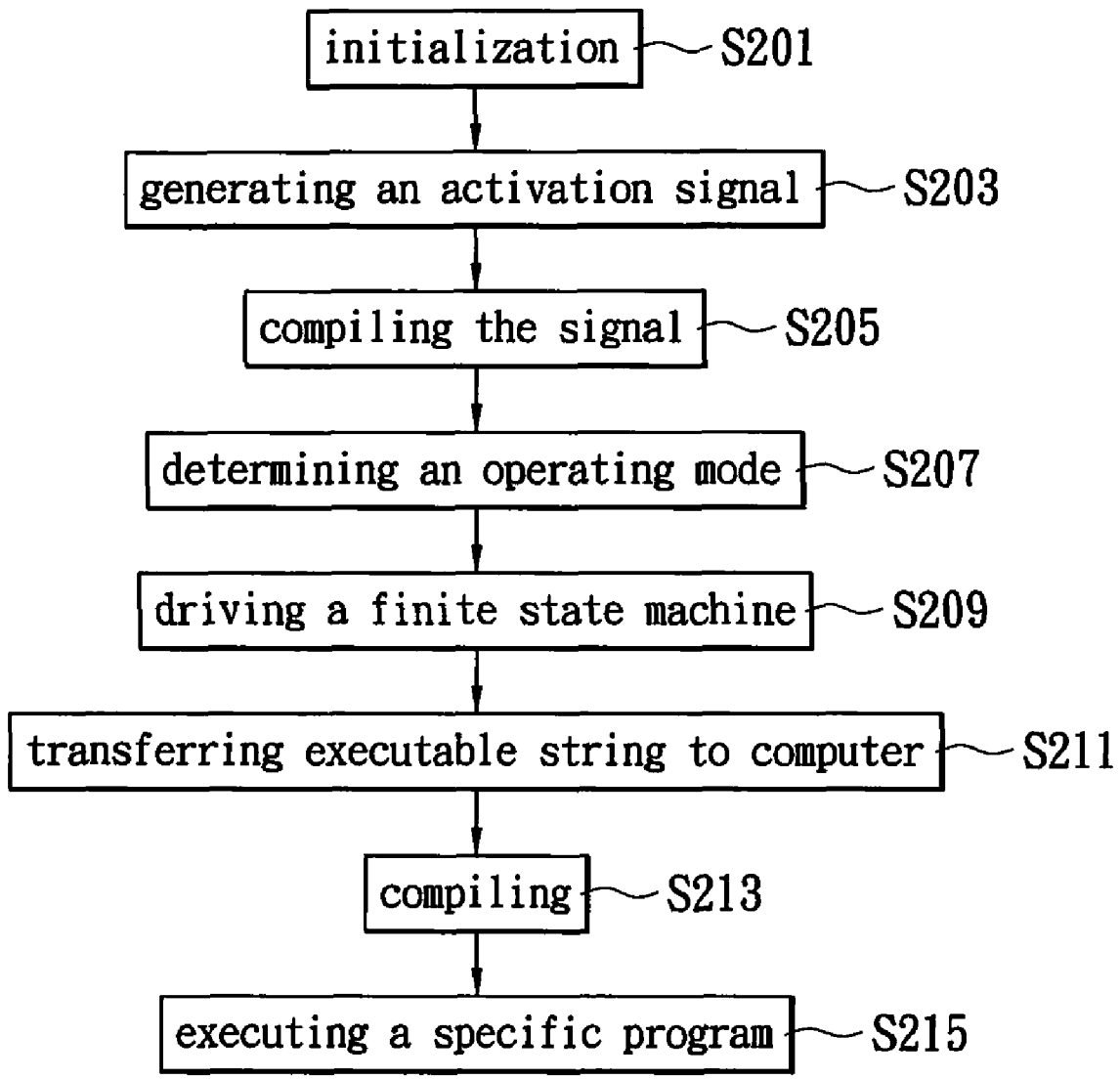
FIG. 11 shows a flowchart of the auto-execution signal processing method of the present invention.

Reference is made to FIG. 11 showing the flow chart of the method of the preferred embodiment.

In the beginning, the method is to initialize the apparatus having the auto-execution function as it connects to a computer (step S201). Next, an activation signal is generated through the activation element initiated by a user (step S203). The activation signal is then compiled by the operating system (step S205). The activation signal is used to drive the apparatus operatively to perform the following process after the compiling.

In the exemplary example, the present computer preferably has the driver, and possibly provides the modified string. The process will determine what the operating mode would be on the apparatus firstly (step S207). For example, the value recorded in the buffer can be used to make the determination. It is determined whether the preset program or purpose needs to be performed. According to the preferred embodiment, the assembly of the central control interface, human interface device, and finite state machine of the apparatus decides an operating route based on the buffer's value. Then the finite state machine is driven (step S209). If a different string is required to be performed by referring to the value, the finite state machine will transfer an updated string to the computer system (step S211). The operating system compiles the string (step S213) in order to execute a specific program (step S215).

In summation of above description, the present invention discloses an auto-execution signal processing method and an apparatus performing the method. An activation element is particularly provided to activate an auto-execution process. A finite state machine is used to transfer a specific string to a computer system in order to achieve a specific purpose without any need of driver therefor.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. An auto-execution signal processing method, comprising:
    initializing an apparatus having an auto-execution function; and
    activating an auto-execution process through an activation element mounted on the apparatus having the auto-execution function;
    wherein the auto-execution process comprises:
        driving a signal processing circuit including a finite state machine to transfer an executable string of code from a memory block;
        transferring the executable string of code to a computer system through a connection interface; and
        executing a web browser program after the executable string of code compiled by an operating system of the computer system, such that a latest driver of the apparatus having the auto-execution function is automatically downloaded from a specific web page via the web browser program.

2. The method of claim 1, wherein the activation element generates an activation signal through a human interface device installed in the apparatus having the auto-execution function, so as to activate the auto-execution process.

3. The method of claim 2, wherein the activation element is implemented as one or more buttons, and the activation signal is a key code produced by a click, and the signal processing circuit is driven by pressing the button one or more times.

4. The method of claim 3, wherein the executable string of code is read from the memory block after the finite state machine is driven.

5. The method of claim 4, wherein the memory block is rewritable, that is, the executable string of code stored in the rewritable memory block is modifiable.

6. The method of claim 1, wherein the auto-execution process further includes a step of determining an operating mode, so as to decide the program to be executed.

7. The method of claim 6, wherein if the step of determining the operating mode is to determine the apparatus executing an update process, another executable string is transferred, so as to decide the program to be executed.

8. An apparatus having an auto-execution function, comprising:
    a signal processing circuit including a finite state machine, composed by a series of logic circuits, and used to transfer an executable string from a memory block after the circuit is driven;
    an activation element, electrically connected the signal processing circuit, and used to generate an activation signal for activating an auto-execution process;
    a human interface device, electrically connected to the signal processing circuit, and used to receive the activation signal of the signal processing circuit and generate a signal to identify the apparatus by an operating system;
    a central control interface, electrically connected to the human interface device, wherein the central control interface is the circuit used for controlling and transferring the signals; and
    a connection interface, wherein the apparatus having the auto-execution function connects to a computer system through the connection interface;
    wherein the auto-execution process executes the executable string to enter a specific web page as automatically launching a web browser therefrom a latest driver for the apparatus having the auto-execution function is automatically downloaded after entering the specific web page.

9. The apparatus of claim 8, wherein the memory block is a rewritable memory block, and in which the stored executable string is modifiable.

10. The apparatus of claim 8, wherein the activation element is one or more buttons mounted on the apparatus, and the auto-execution process is activated by pressing one or more buttons.

11. The apparatus of claim 8, wherein the apparatus further includes a register electrically connected to the central control interface, the human interface device and the signal processing circuit.

12. The apparatus of claim 11, wherein the register stores a message representing the operating mode of the apparatus having the auto-execution function.

13. The apparatus of claim 8, wherein the executable string stored in the memory block records a segment of URL string.

14. The method of claim 3, wherein the signal processing circuit is a micro-processing chip.

15. The apparatus of claim 8, wherein the signal processing circuit is a micro-processing chip.

* * * * *